July 4, 1967 J. T. ATKINSON ETAL 3,329,299
CLOSURES FOR PRESSURE VESSELS
Original Filed Oct. 14, 1963 3 Sheets-Sheet 1

INVENTORS
JERRY T. ATKINSON
ROBERT L. JACOBS

BY

ATTORNEYS

July 4, 1967 J. T. ATKINSON ET AL 3,329,299
CLOSURES FOR PRESSURE VESSELS
Original Filed Oct. 14, 1963 3 Sheets-Sheet 2
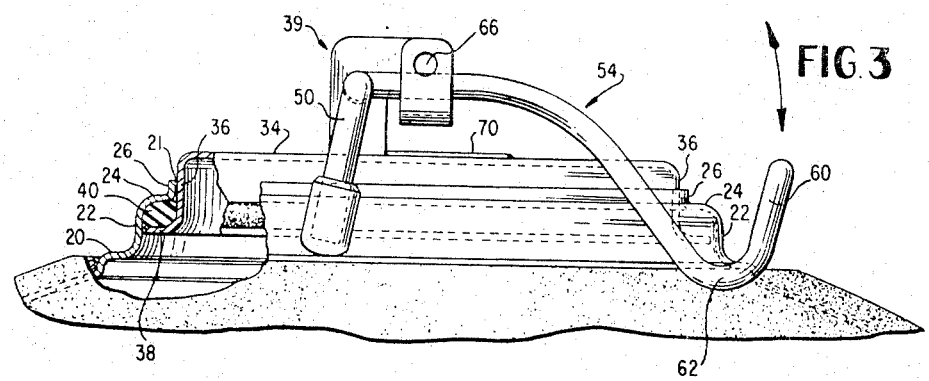
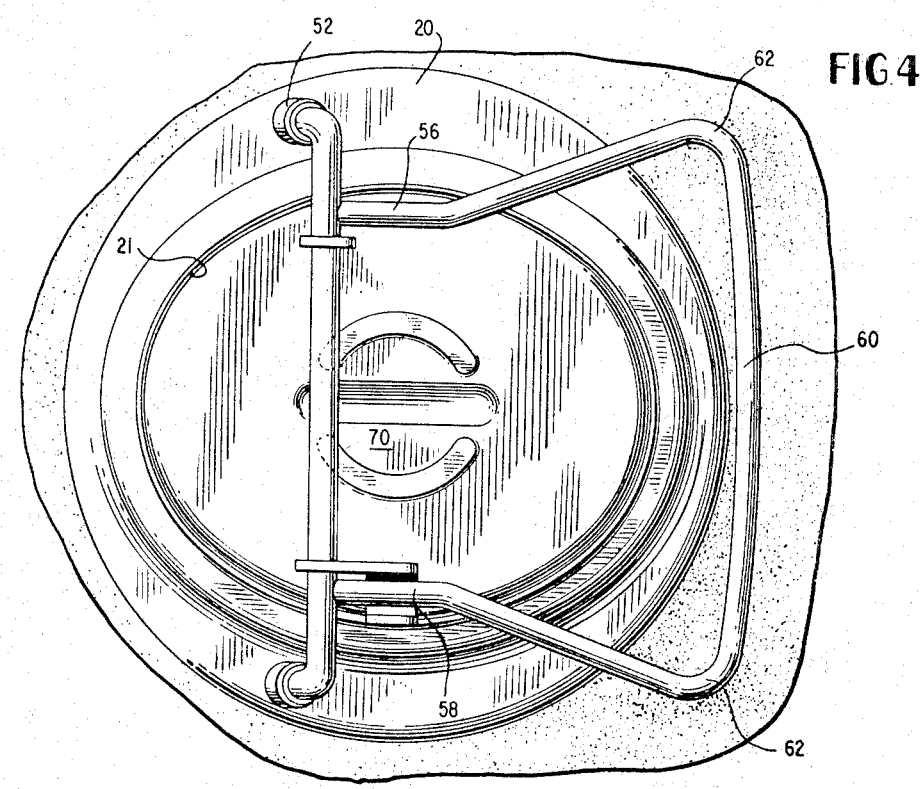
INVENTORS
JERRY T. ATKINSON
ROBERT L. JACOBS
BY
ATTORNEYS

INVENTORS
JERRY T. ATKINSON
ROBERT L. JACOBS

BY

ATTORNEYS

United States Patent Office 3,329,299
Patented July 4, 1967

3,329,299
CLOSURES FOR PRESSURE VESSELS
Jerry T. Atkinson, Waukesha, Wis., and Robert L. Jacobs, Atlanta, Ga., assignors to The Coca-Cola Company, Atlanta, Ga., a corporation of Delaware
Original application Oct. 14, 1963, Ser. No. 315,906. Divided and this application May 3, 1965, Ser. No. 462,778
10 Claims. (Cl. 220—25)

This application is a division of our copending application Ser. No. 315,906, filed Oct. 14, 1963.

This invention relates to closures and, more particularly, to a closure for closing an opening in a container wherein the closure is subjected to pressure from within the container. Such containers are hereinafter referred to generally as pressure vessels.

A closure according to the present invention has particular utility for use with pressure vessels of the type commonly employed in the soft drink trade for transporting either a soft drink syrup or the premixed itself. Such a pressure vessel is customarily an elongated tank structure having a relatively large ova- shaped opening in the top thereof for filling the vessel, and for ready access to the interior of the vessel for cleaning and sanitation purposes. The vessel further includes a pair of dispensing outlets equipped with quick-disconnect fittings to which hoses are connected for dispensing the contacts.

Since the vessel contents are transported under positive pressure, it is desirable to employ a closure which may be inserted into the vessel from the outside, and then moved outwardly to sealingly close the opening, thereby employing the positive pressure within the vessel to maintain a positive seal at the opening. A resilient gasket member, or O-ring, is provided between the closure and the internal peripheral portion of the pressure vessel surrounding the opening to provide a fluid tight seal between the closure and vessel when pressure is applied to the interior of the vessel.

Problems in connection with providing a closure which is fully satisfactory for use with a pressure vessel as just described including providing a closure operator by means of which the closure may be effectively positioned with respect to the vessel opening to close the latter, and which can then be operated readily to move the closure with respect to the vessel opening to compress the resilient gasket sufficiently so that positive pressure can be applied to the vessel interior to assist in maintaining the closure in closed position. Also, since the gasket may become deformed in use, the operator should be able to compensate for this so that, despite such deformation, the closure can still be sealed sufficiently upon initial closing to permit subsequent retention of pressure applied to the vessel interior. Finally, the closure and operator should be rugged, be made up of relatively few parts, and include means for sealing the operator in closed position.

The present invention is directed to providing a closure which effectively solves the foregoing problems, among others, and which is therefore fully satisfactory for the purpose intended.

It is therefore an object of the present invention to provide a new and improved closure of the internal type for closing an on-circular opening in a pressure vessel.

It is another object of the present invention to provide such a closure including a new and improved operator for moving the closure into closed position with respect to the vessel opening.

It is another object of the present invention to provide such a closure including a new and improved operator capable of repeatedly effectively seating said closure and closed position to permit buildup of internal pressure within said vessel, despite possible sealing gasket wear.

It is another object of the present invention to provide a new cover member for guarding a pressure vessel fitting against tampering.

Briefly described, a preferred embodiment of a closure according to the present invention is adapted to close an oval-shaped opening in a pressure vessel wherein the opening is bounded by an internal gasket seat and the latter is bounded by a substantially flat upper surface portion of the vessel. The closure comprises an oval-shaped substantially flat body portion, and a peripheral skirt extending downwardly from the body portion and terminating in a peripheral laterally extending flange defining a gasket seat on the closure. To close the opening, the closure is inserted into the vessel through the opening, and is then moved toward the opening to compress a resilient gasket between the closure seat and the vessel seat to sealingly close the opening.

The closure operator includes a pair of oppositely disposed spaced apart lugs extending upwardly from the body portion of the closure and located along a line parallel to one side of the minor diameter of the body portion. Each lug includes an opening therein and an elongated shaft extends through said openings, being supported by the lugs for rotation about the shaft axis. The shaft ends terminate in perpendicularly extending legs parallel to each other. These legs terminate in feet which engage the flat upper vessel surface adjacent the opening to cam the closure into sealing relation with the opening as the legs go overcenter with respect to the lug openings during movement of the operator into closed position.

A protective cover or guard is carried by the closure, and is of size and shape adapted to overlie a pair of quick disconnect pressure fittings positioned closely adjacent said vessel opening whereby such fittings are protected against tampering during transport of the vessel. In a preferred embodiment, the protective cover is hinged to the operator shaft for rotation about the latter, being movable from a position in which the cover overlies the pressure fittings to a position in which the fittings are exposed, and vice versa.

Other objects and advantages of the present invention will become more apparent from the following detailed description, taken in conjunction with the attached drawings in which:

FIG. 3 is an elevation view similar to FIG. 2 but taken at right angles with respect to the view shown in FIG. 2, a portion of the FIG. 3 view being broken away to show the closure seated with respect to the pressure vessel;

FIG. 4 is a top plan view of the structure shown in FIG. 3;

Figure 1:
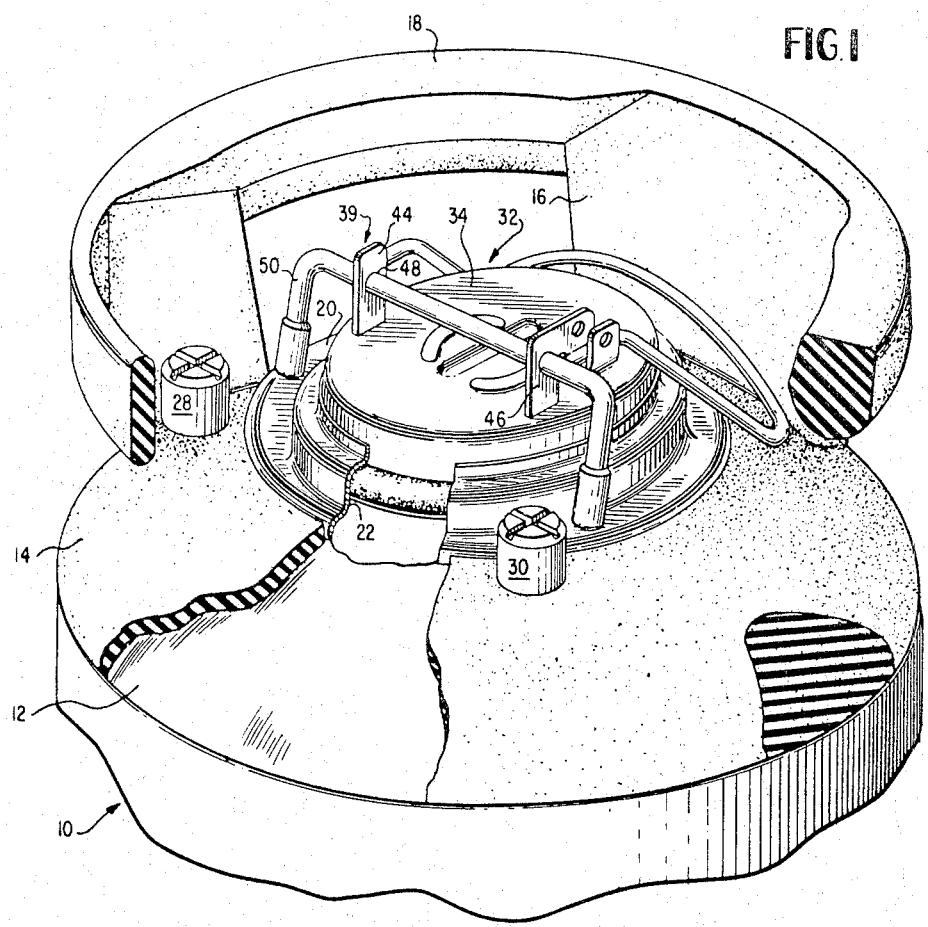
FIG. 1 is a perspective view of the top portion of a pressure vessel showing a closure according to a preferred embodiment of the present invention in closed position with respect to said vessel, parts of the vessel portion shown being broken away to show more clearly the relation of the closure with respect to the vessel.

Referring now to the drawings in detail, FIG. 1 discloses a pressure vessel indicated generally by the reference numeral 10 having a generally dome shaped end panel 12 to which is adhesively bonded a molded rubber protective cushion 14 having an upstanding skirt portion 16 in which are formed handles 18. The central portion of the dome shaped end of pressure vessel 10 has a generally circular, substantially flat upper surface 20 in which is formed an oval shaped opening 21 to provide access to the interior of the vessel for filling, cleaning, or the like. Extending around the inner periphery of upper surface portion 20 is a first upwardly extending rim portion 22 (see FIG. 3 in particular) terminating in a radially inwardly extending flange 24 which, in turn, terminates in a second upwardly extending rim portion 26. Rim 22 and flange 24 cooperate to form a seat for a sealing gasket member normally carried by the closure member. A pair of quick-disconnect pressure fittings 28, 30 are provided in the end of the pressure vessel adjacent surface 20, and are both positioned to one side of the minor diameter of oval shaped opening 21 and laterally spaced one on either side of the major diameter of the opening.

The closure member according to the present invention, indicated generally by the numeral 32, comprises an oval shaped, substantially flat body portion 34 having integrally formed around its outer periphery a depending skirt 36 terminating in a laterally outwardly extending flange 38 (see FIG. 3 in particular). The skirt and flange cooperate to form a seat for a resilient gasket 40 to sealingly close the opening in the pressure vessel. Preferably closure 32 is formed by drawing from a single piece of heavy gauge stainless steel sheet material, such as 16 gauge. The shape of the opening 21 and closure member 32 are such that the major diameter of opening is greater than the minor diameter of flange 38 so that the closure may be inserted into the opening from the outside, then moved outwardly to seat the resilient gasket to seal the opening.

An operator, indicated generally by the reference numeral 39, is mounted on the outer surface of body portion 34 of the closure to move the closure outwardly to close the opening in the pressure vessel and form an initial seal therewith. The operator comprises a normally straight elongated shaft 42 mounted for rotation about an axis parallel to and spaced from the minor diameter of the oval shaped body portion 34. Shaft 42 is supported by a pair of upstanding support members or lugs 44, 46 mounted, as by welding, to the outer surface of body portion 34 near the outer periphery thereof and spaced to one side of the minor diameter, and one on each side of the major diameter of the body portion. Supports 44, 46 are each provided with an opening 48 journaling shaft 42 for rotation about an axis substantially parallel to the minor diameter of oval shaped body portion 34.

Shaft 42 terminates at each end in a substantially perpendicularly extending leg 50, said legs being substantially parallel to each other and having the foot portion covered, as at 52, with a coating of low friction material, such as nylon.

A handle, indicated generally by the reference numeral 54, may be provided for rotating shaft 42 and comprises a generally U-shaped rod member having substantially parallel end portions 56, 58 fixed, as by welding, to shaft 42 adjacent to and outboard of supports 44, 46 respectively. The closed end of the "U" serves as a hand grip 60 and is formed with a length greater than the maximum diameter of the oval shaped opening 21 in the vessel to prevent the closure from dropping into the vessel in the event of inadvertent release of the handle. The extremities 62 of the grip portion of the handle are deflected downwardly to contact the top of the pressure vessel to limit rotation of shaft 42 when the handle has been moved to rotate the shaft to bring the closure into the closed portion.

A generally U-shaped bracket 64 is formed on support 6 in position to receive end portion 58 of handle 54 when the handle is moved to rotate shaft 42 to the closed position, and a pair of openings 66 are provided in bracket 64 to receive a conventional wire seal (not shown) to seal the handle in the closed position.

Figure 5:
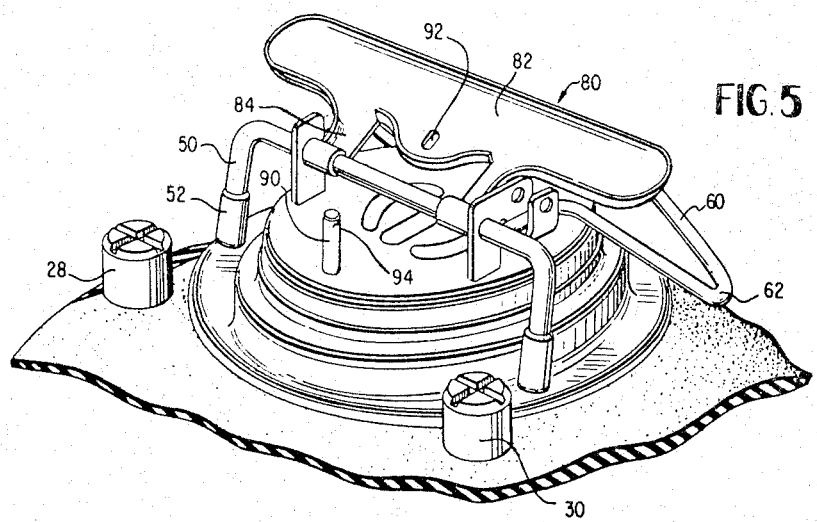
FIG. 5 is a perspective view generally similar to FIG. 1 but including a protective cover for the pressure vessel fittings.
Figure 6:
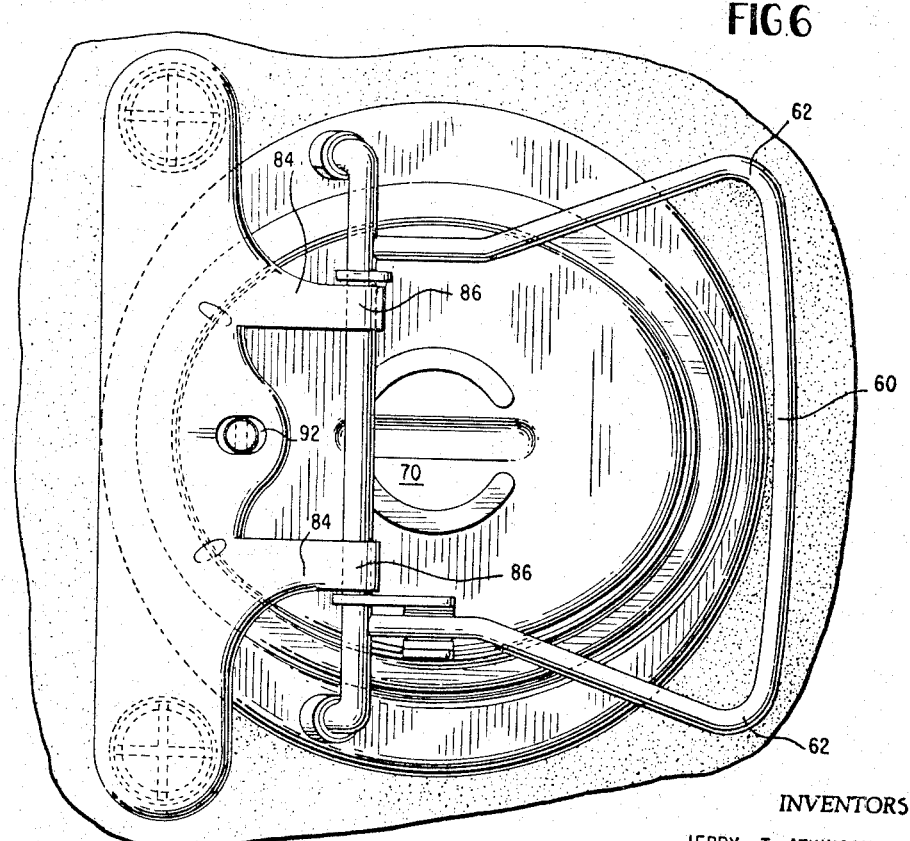
FIG. 6 is a top plan view, somewhat enlarged, of the structure shown in FIG. 5, but with the protective cover shown in overlying relation with respect to the pressure fittings.

Referring now to FIGS. 5 and 6 of the drawings, an alternate construction of the closure is shown in which a cover member 80 is provided for protecting pressure fittings 28, 30 against inadvertent damage or unauthorized tampering. Cover 80 comprises a substantially flat elongated guard member 82 having a pair of laterally extending integrally formed arms 84 having their ends 86 hangedly attached to shaft 42 between supports 44, 46. Arms 84 support guard member 82 for rotation between a position, illustrated in FIG. 6, covering fittings 28, 30 and a position, illustrated in FIG. 5, wherein the fittings are exposed. A post 90 fixedly secured, as by welding, to closure body portion 34, and extending normally upward therefrom, projects through an opening 92 in guard member 82 when the cover is in position over fittings 28, 30. An opening 94 is provided in post 90 to receive a conventional wire seal (not shown) to retain the cover in position over the fittings to assure against undetected or unauthorized tampering with the fittings.

To install closure 32 in pressure vessel 10, the closure is supported by the grip portion 60 of handle 54, and is inserted through the oval shaped opening 21 in the pressure vessel and then moved outwardly to engage resilient gasket 40 with the internal seat defined by rim 22 and flange 24 and surrounding opening 21. Handle 54 is then pivoted downward toward the top of the pressure vessel to turn shaft 42 and engage the nylon covered feet of legs 50 with the flat upper surface 20 of the top of the vessel. Legs 50 are slightly longer than the distance from openings 48 of shaft supports 44, 46 to surface 20 so that, in order to move legs 50 into the overcentered position (most clearly seen in FIG. 3) it is necessary to compress resilient gasket 40. This provides an initial seal between the closure and the pressure vessel.

Figure 2:
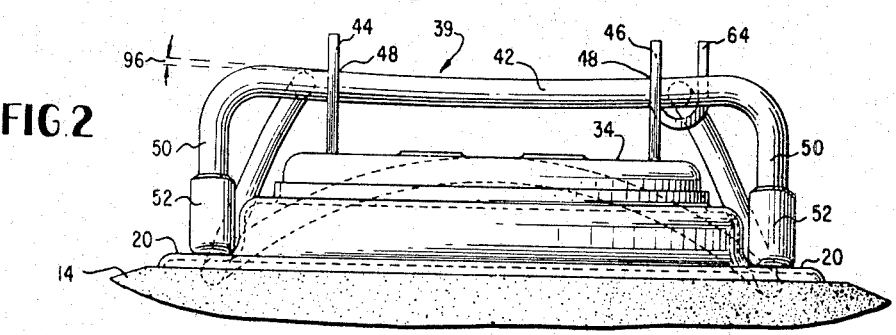
FIG. 2 is an elevation view of a top portion of the vessel shown in FIG. 1, again showing the closure in closed position.

The conventional resilient gasket or O-ring, used to form the seal between the closure and the pressure vessel has a tendency to assume a permanent set, or reduction in thickness, after prolonged use. To compensate for this, shaft 42 is supported as a simple overhanging beam by supports 44, 46 so that the vertical component of the reaction force between surface 20 and feet 52 will bend or deflect the ends of beam 42 slightly upwardly as indicated by angle 96 in FIG. 2 to maintain a positive pressure on gasket 40 to maintain the seal. Since beam 42 is simply supported, the usual beam formulas may be applied in calculating the deflection of the ends of the beam, and to determine the appropriate size or diameter of the shaft (for a given material) to maintain the desired pressure on the gasket to assure a positive seal.

In addition, it will be noted that handle 54 is not relied upon to resist the aforementioned reaction force and thus does not enter into maintaining positive pressure on gasket 40. Handle 54 may therefore be of smaller diameter than shaft 42 and, in an actual embodiment, handle 54 has a diameter of $3/16''$ compared to $7/32''$ for shaft 42.

As is most evident from FIG. 3 of the drawings, when the closure is in the sealed position operator 39 is in the overcentered position so that it is necessary to apply a positive force to handle 54 to pivot the handle upwardly along the path indicated by the arrow to rotate shaft 42 to move legs 50 through the vertical deadcenter position to the unsealed position. This prevents unintentional relaxing of the compression force maintaining the seal at the resilient gasket. Also, bracket 64 provides a means of attaching a conventional wire seal to prevent undetected opening of the closure.

Once the closure is installed and the initial seal completed, internal fluid pressure is applied to the vessel by admitting gas under pressure through one of the pressure fittings 28, 30. This internal pressure, acting on the interior of the closure, will maintain the initial seal formed between the closure and the top of the pressure vessel.

While we have disclosed and illustrated a preferred embodiment of our invention we wish it understood that we do not intend to be restricted solely thereto, but we do intend to cover all embodiments thereof which would be apparent to one skilled in the art which come within the spirit and scope of our invention.

We claim:
1. A closure for sealingly closing a non-circular opening in a pressure vessel wherein said opening is bounded by internal seat defining means and the latter is bounded by a substantially flat outer surface portion of said vessel, and said closure is inserted into the pressure vessel through the opening to be closed and then moved into cooperative relation with said internal seat defining means to sealingly close the opening; said closure comprising a substantially flat body portion, a peripheral skirt portion extending downwardly with respect to said body portion and terminating in a peripheral laterally extending flange, said skirt and flange defining a seat adapted to support a resilient gasket member in fluid tight sealing relation with said pressure vessel internal seat defining means; and operator means for moving said closure into closed position with respect to said vessel opening, said operator means including a normally straight shaft terminating at each end in a substantially perpendicular leg, and a pair of spaced apart support members extending upwardly from said closure body portion, each of said support members including means supporting said shaft for rotation about the longitudinal axis of said shaft, said means being located between said shaft legs and said shaft and shaft legs having lengths predetermined so that, when said closure is positioned for movement into closed position, said shaft straddles a dimension of said opening and the foot of each of said legs can be brought into contact with said flat outer surface of said vessel surrounding said opening, the length of each leg being greater than the distance from said shaft support means to said flat vessel outer surface portion when said closure is in closed position whereby rotation of said shaft to move said legs overcenter with respect to said shaft support means cams said closure outwardly toward said opening to compress a resilient gasket member located between said closure seat and said vessel internal seat and thereby seal said opening, and said legs flex the portions of said shaft located between said shaft supports and legs outwardly with respect to said opening to maintain a continuous pressure biasing said closure toward said vessel internal seat.

2. A closure according to claim 1 wherein each shaft leg foot is covered with a low friction material to reduce friction when said legs are moved overcenter against said vessel outer surface portion.

3. A closure according to claim 1 wherein said operator means includes a handle connected to said shaft for rotating said shaft, and said handle includes a grip member having a length greater than the maximum dimension of said vessel opening to prevent said closure from dropping to the bottom of said pressure vessel upon inadvertent release of said handle.

4. A closure according to claim 3 wherein said handle is substantially U-shaped and the ends of said U are connected to said shaft between said shaft supports and said shaft legs.

5. A closure according to claim 4 wherein the end portions of said U-shaped handle are substantially parallel to each other, and the arms of said handle extend from said end portions in a direction such that said handle contacts said pressure vessel to limit further rotation of said shaft after said handle has been moved to rotate said shaft to bring said closure into closed position.

6. A closure according to claim 4 wherein at least one of said shaft supports includes a U-shaped bracket positioned with respect to one end portion of said handle to receive the latter when said handle is moved to rotate said shaft to bring said closure into closed position, said bracket including means for receiving a seal member for sealing said handle in closed position.

7. For use with a pressure vessel having a filling opening and at least one pressure fitting located adjacent said opening, a closure for sealingly closing said opening and for guarding said fitting, said closure comprising a first cover member insertable into said opening and movable outwardly with respect to said opening to sealingly close said opening, operator means carried by said first cover member and operable to move said first cover member into sealingly closed relation with said opening, and a second cover member for guarding said fitting, said second cover member being carried by said operator means and including a portion movable into overlying relation with respect to said fitting when said first cover means is in sealingly closed position with respect to said opening.

8. A closure according to claim 7 wherein said operator means includes a shaft and said second cover member is pivotally connected to said shaft for rotation about said shaft from a position in which said second cover member overlies said fitting to a position in which said fitting is exposed, and vice versa.

9. A closure according to claim 8 wherein said second cover member includes an opening extending therethrough, and said first cover member includes an upwardly extending post positioned so that when said second cover member is moved into overlying relation with respect to said fitting, said post extends through said opening, said post including means for receiving a seal to prevent said second cover member from being moved back to expose said fitting.

10. For use with a pressure vessel having a filling opening and at least one pressure fitting located adjacent said opening, a closure for sealingly closing said opening and for guarding said fitting, said closure comprising a first cover member for sealingly closing said opening, and a second cover member for guarding said fitting, said second cover member being movably connected to means on said first cover member.

References Cited
UNITED STATES PATENTS

| | | | |
|---|---|---|---|
| 2,080,728 | 5/1937 | MacNeill et al. | 220—85 |
| 3,186,577 | 6/1965 | Tennison | 220—25 |

THERON E. CONDON, *Primary Examiner.*

G. T. HALL, *Assistant Examiner.*